(12) United States Patent
Fukunaga

(10) Patent No.: US 11,454,250 B2
(45) Date of Patent: Sep. 27, 2022

(54) BLOWER

(71) Applicant: MAKITA CORPORATION, Anjo (JP)

(72) Inventor: Ko Fukunaga, Anjo (JP)

(73) Assignee: MAKITA CORPORATION, Anjo (JP)

( * ) Notice: Subject to any disclaimer, the term of this patent is extended or adjusted under 35 U.S.C. 154(b) by 218 days.

(21) Appl. No.: 16/883,226

(22) Filed: May 26, 2020

(65) Prior Publication Data

US 2020/0378404 A1    Dec. 3, 2020

(30) Foreign Application Priority Data

May 27, 2019  (JP) .............................. JP2019-098799

(51) Int. Cl.
| | |
|---|---|
| *F04D 29/58* | (2006.01) |
| *A01G 20/47* | (2018.01) |
| *B08B 5/02* | (2006.01) |
| *F04D 19/00* | (2006.01) |
| *F04D 25/06* | (2006.01) |
| *H01M 50/20* | (2021.01) |

(52) U.S. Cl.
CPC ......... *F04D 29/5813* (2013.01); *A01G 20/47* (2018.02); *B08B 5/02* (2013.01); *F04D 19/002* (2013.01); *F04D 25/0673* (2013.01); *H01M 50/20* (2021.01); *H01M 2220/30* (2013.01)

(58) Field of Classification Search
CPC .. F04D 19/02; F04D 25/0673; F04D 29/5813; B08B 5/02
See application file for complete search history.

(56) References Cited

U.S. PATENT DOCUMENTS

| | | | | |
|---|---|---|---|---|
| 10,232,502 | B2* | 3/2019 | Bylund | F04D 25/06 |
| 10,487,850 | B2* | 11/2019 | Shao | F04D 29/545 |
| 11,248,626 | B2* | 2/2022 | Shao | F04D 25/0673 |
| 2016/0107202 | A1 | 4/2016 | Suzuki et al. | |
| 2020/0313262 | A1* | 10/2020 | Suzuki | H01M 50/30 |
| 2020/0378404 | A1* | 12/2020 | Fukunaga | B08B 5/02 |
| 2021/0148372 | A1* | 5/2021 | Naka | F04D 27/004 |

FOREIGN PATENT DOCUMENTS

JP       2016-079751 A       5/2016

* cited by examiner

*Primary Examiner* — Patrick Hamo
(74) *Attorney, Agent, or Firm* — Sughrue Mion, PLLC

(57) ABSTRACT

A blower may include an air passage including an air intake hole and an air discharge hole; a fan disposed in the air passage and passing air from the air intake hole to the air discharge hole; a control unit; and a chamber that houses the control unit. The chamber may include a first communication hole communicating outside of the blower to the chamber, and a second communication hole communicating a part of the air passage disposed on an air intake hole side relative to the fan to the chamber. The chamber may include a cooling air passage which allows air having flowed in from the first communication hole to flow out from the second communication hole via the control unit. The first communication hole may be disposed on the air intake hole side relative to the fan with respect to a direction along a rotation axis of the fan.

9 Claims, 4 Drawing Sheets

BLOWER

CROSS-REFERENCE TO RELATED APPLICATION

This application claims priority to Japanese Patent Application No. 2019-098799, filed on May 27, 2019, the entire contents of which are hereby incorporated by reference into the present application.

TECHNICAL FIELD

The disclosure herewith relates to a blower.

BACKGROUND

Japanese Patent Application Publication No. 2016-79751 describes a blower. The blower comprises an air passage, a fan, a motor, a control unit, and a chamber. The air passage has an air intake hole through which air flows in and an air discharge hole through which air flows out. The fan is disposed in the air passage and configured to pass air from the air intake hole to the air discharge hole. The motor is configured to rotate the fan. The control unit is configured to control drive of the motor. The chamber houses the control unit. The chamber has a first communication hole communicating the outside of the blower to the chamber, and a second communication hole communicating a part of the air passage that is disposed on an air intake hole side relative to the fan to the chamber. The chamber includes a cooling air passage which allows air having flowed in from the first communication hole to flow out from the second communication hole via the control unit. With respect to a direction along a rotation axis of the fan, the first communication hole is disposed on an air discharge hole side relative to the fan.

In such a blower as described above, when the fan rotates, air flows into the cooling air passage from the first communication hole, passes the control unit, and then flows into the air passage from the second communication hole. The control unit is thereby cooled.

SUMMARY

In the blower described above, the cooling air passage extends from the first communication hole, which is disposed on the air discharge hole side relative to the fan with respect to the direction along the rotation axis of the fan, to the second communication hole which is disposed on the air intake hole side relative to the fan with respect to the direction. In this configuration, the cooling air passage is long, and thus a pressure loss of the air flowing through the cooling air passage is large. This requires much energy to allow a sufficient amount of air to flow through the cooling air passage to cool the control unit. The disclosure herein provides a technique that allows a sufficient amount of air to flow through a cooling air passage to cool a control unit with less energy.

The disclosure herein discloses a blower. The blower may comprise an air passage, a fan, a motor, a control unit, and a chamber. The air passage may include an air intake hole through which air flows in and an air discharge hole through which air flows out. The fan may be disposed in the air passage and configured to pass air from the air intake hole to the air discharge hole. The motor may be configured to rotate the fan. The control unit may be configured to control drive of the motor. The chamber houses the control unit. The chamber may include a first communication hole communicating outside of the blower to the chamber, and a second communication hole communicating a part of the air passage that is disposed on an air intake hole side relative to the fan to the chamber. The chamber may include a cooling air passage which allows air having flowed in from the first communication hole to flow out from the second communication hole via the control unit. The first communication hole may be disposed on the air intake hole side relative to the fan with respect to a direction along a rotation axis of the fan.

In the above configuration, the cooling air passage extends from the first communication hole, which is disposed on the air intake hole side relative to the fan with respect to the direction along the rotation axis of the fan, to the second communication hole which is disposed on the air intake hole side relative to the fan with respect to the direction. Compared with a configuration in which the first communication hole is disposed on the air discharge hole side relative to the fan and the second communication hole is disposed on the air intake hole side relative to the fan, the cooling air passage in the above configuration can be made shorter, thereby reducing a pressure loss of the air flowing through the cooling air passage. Thus, the above configuration enables a sufficient amount of air to flow through the cooling air passage to cool the control unit with less energy.

DETAILED DESCRIPTION

Figure 1:
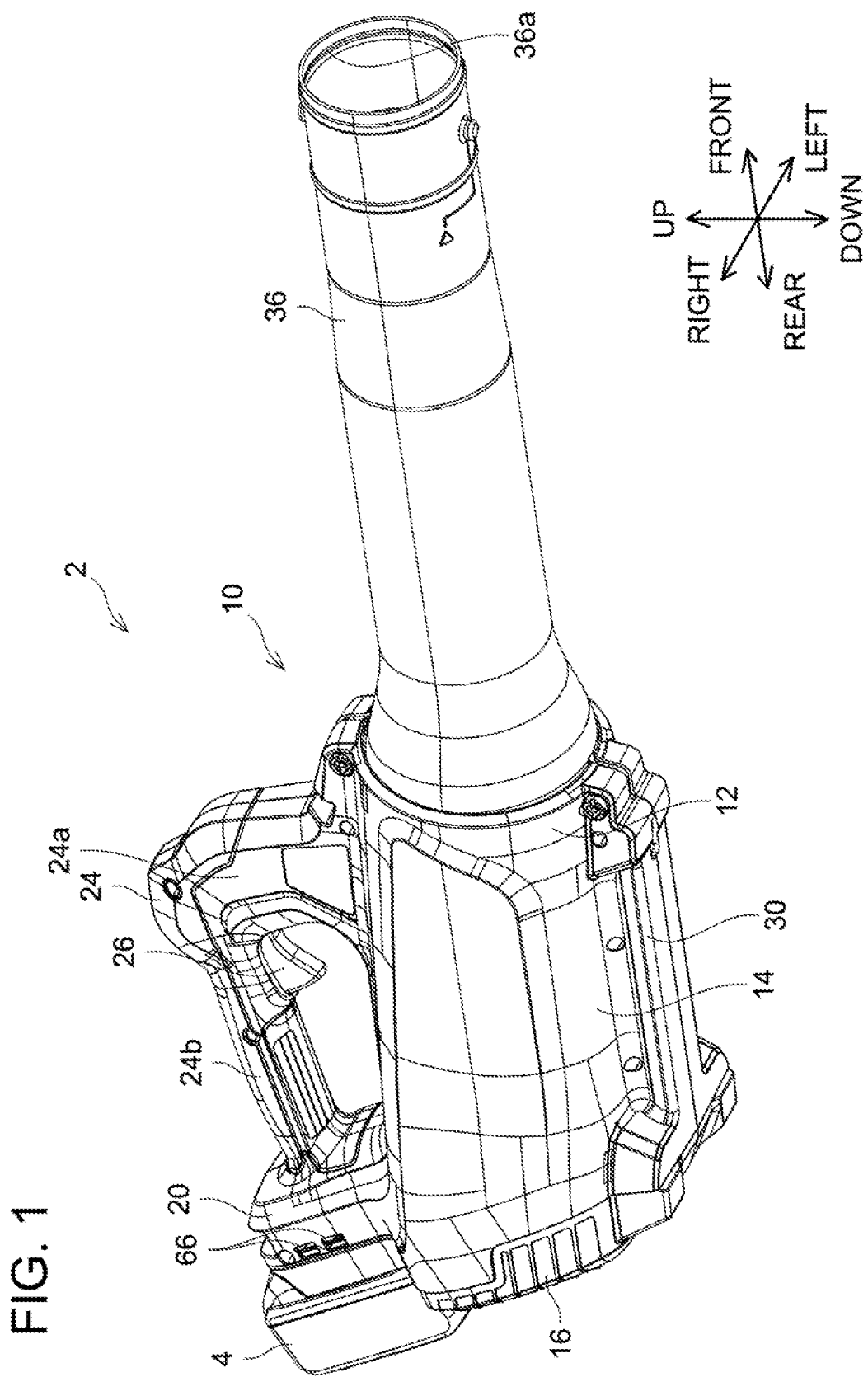
FIG. 1 is a perspective view of a blower 2 of an embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved blowers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the cooling air passage may include a passage which reaches the second communication hole from the first communication hole via the control unit without turning at an acute angle less than 90 degrees.

In the above configuration, air flowing through the cooling air passage flows from the first communication hole to the second communication hole via the control unit without turning at an acute angle less than 90 degrees. Compared with a configuration in which the air turns at an acute angle less than 90 degrees, a pressure loss of the air flowing through the cooling air passage is small in the above configuration. Thus, the configuration enables a sufficient amount of air to flow through the cooling air passage to cool the control unit with less energy.

In one or more embodiments, the blower may further comprise a battery and a battery terminal. The battery may be configured to supply electric power to the motor. The battery terminal may be configured to allow the battery to be detachably attached thereto. At least a part of the battery terminal may be disposed in the chamber. Air flowing through the cooling air passage may pass the control unit and the at least a part of the battery terminal.

In the above configuration, the air flowing through the cooling air passage passes the at least a part of the battery terminal and the control unit. Both the battery terminal and the control unit can thereby be cooled.

In one or more embodiments, the control unit and the at least a part of the battery terminal may be disposed to face each other in the chamber. Air flowing through the cooling air passage may pass between the control unit and the at least a part of the battery terminal.

In the above configuration, the air flowing through the cooling air passage cools both the control unit and the battery terminal as it passes between the control unit and the at least a part of the battery terminal. Compared with a configuration in which the air passes one of the control unit and the at least a part of the battery terminal after having passed the other of the control unit and the at least a part of the battery terminal, the cooling air passage in the above configuration can be made much shorter, thereby further reducing the pressure loss of the air flowing through the cooling air passage.

In one or more embodiments, the control unit may be inclined with respect to the direction along the rotation axis of the fan.

In a typical blower, its longitudinal direction coincides with a direction along the rotation axis of the fan. The above configuration enables reduction in size of the chamber, which houses the control unit, with respect to the longitudinal direction of the blower, which results in reduction in size of the blower with respect to the longitudinal direction.

In one or more embodiments, the fan may be an axial flow fan.

Compared with a configuration in which the fan is a centrifugal fan, the blower can be reduced in size in the above configuration.

In one or more embodiments, the blower may further comprise a handle configured to be gripped by an operator to allow the operator to carry the blower by gripping the handle with a hand of the operator.

The above configuration enables the operator to easily handle the blower.

EMBODIMENT

Referring to FIGS. 1 to 4, a blower 2 of an embodiment will be described. The blower 2 is, for example, a blower used for blowing fallen leaves, etc., to gather them. As shown in FIG. 1, the blower 2 comprises a battery 4 and a main body 10. In the following description, the longitudinal direction of the blower 2 will be referred to as a front-rear direction of the blower 2, a direction perpendicular to the front-rear direction will be referred to as an up-down direction of the blower 2, and a direction perpendicular to the front-rear direction and the up-down direction will be referred to as a right-left direction of the blower 2.

The main body 10 comprises a main body housing 12, an upper handle 24, and a lower handle 30. The main body housing 12 comprises a lower housing 14, a cover member 16, and an upper housing 20. The longitudinal direction of the lower housing 14 is along the front-rear direction. Both longitudinal ends of the lower housing 14 have openings, respectively. The lower housing 14 includes an inner space that extends from the opening at the longitudinal rear end to the opening at the longitudinal front end of the lower housing 14.

Figure 2:
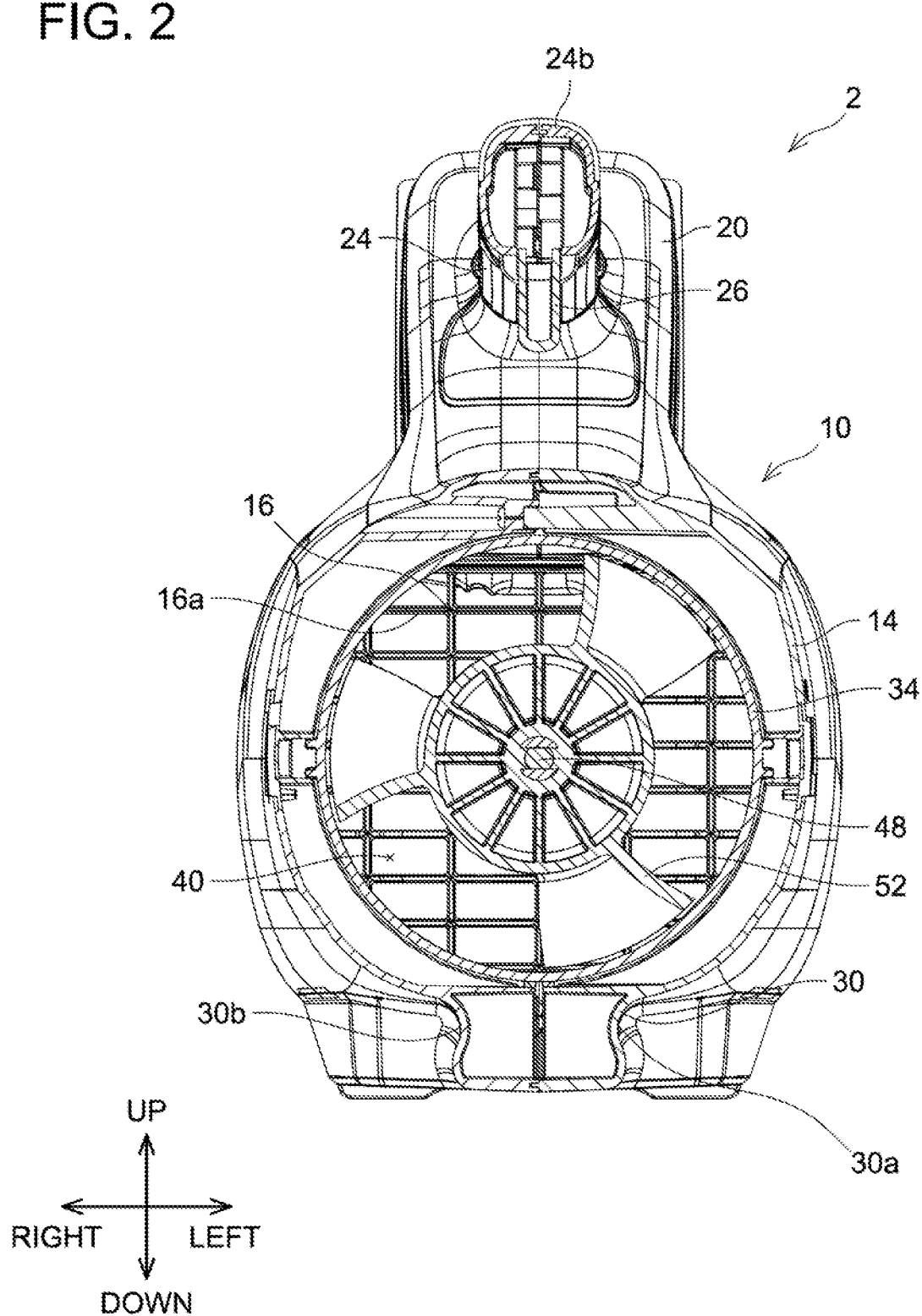
FIG. 2 is a cross-sectional view of the blower 2 of the embodiment in the vicinity of the center of the blower 2 in front-rear direction, along a plane perpendicular to the front-rear direction.

The cover member 16 covers the opening at the rear end of the lower housing 14. As shown in FIG. 2, the cover member 16 includes a plurality of air intake holes 16a. The air intake holes 16a penetrate the cover member 16 in a thickness direction of the cover member 16. The plurality of air intake holes 16a communicates the outside of the blower 2 to the inner space of the lower housing 14.

As shown in FIG. 1, the upper housing 20 is disposed on an upper rear surface of the lower housing 14. The battery 4 is attached to a rear surface of the upper housing 20. The blower 2 is driven by electric power supplied from the battery 4.

The upper handle 24 comprises a support portion 24a and a grip portion 24b. The support portion 24a extends upward from an upper front surface of the lower housing 14. The grip portion 24b extends rearward from an upper rear surface of the support portion 24a and is connected to a front surface of the upper housing 20. The cross-sectional shape of the grip portion 24b is substantially circular. An operator can carry the blower 2 by gripping the grip portion 24b by the hand.

A trigger switch 26 is disposed on a lower surface of the grip portion 24b. The trigger switch 26 is a switch for the operator to control the drive of the blower 2. The blower 2 is driven with the trigger switch 26 pushed up. On the contrary, the blower 2 is not driven with the trigger switch 26 not pushed up.

The lower handle 30 protrudes downward from a lower surface of the lower housing 14. The lower handle 30 extends in the front-rear direction. As shown in FIG. 2, a left side surface 30a and a right side surface 30b of the lower handle 30 are recessed toward each other. The operator can grip the grip portion 24b of the upper handle 24 with one hand, while gripping the lower handle 30 with the other hand.

Figure 3:
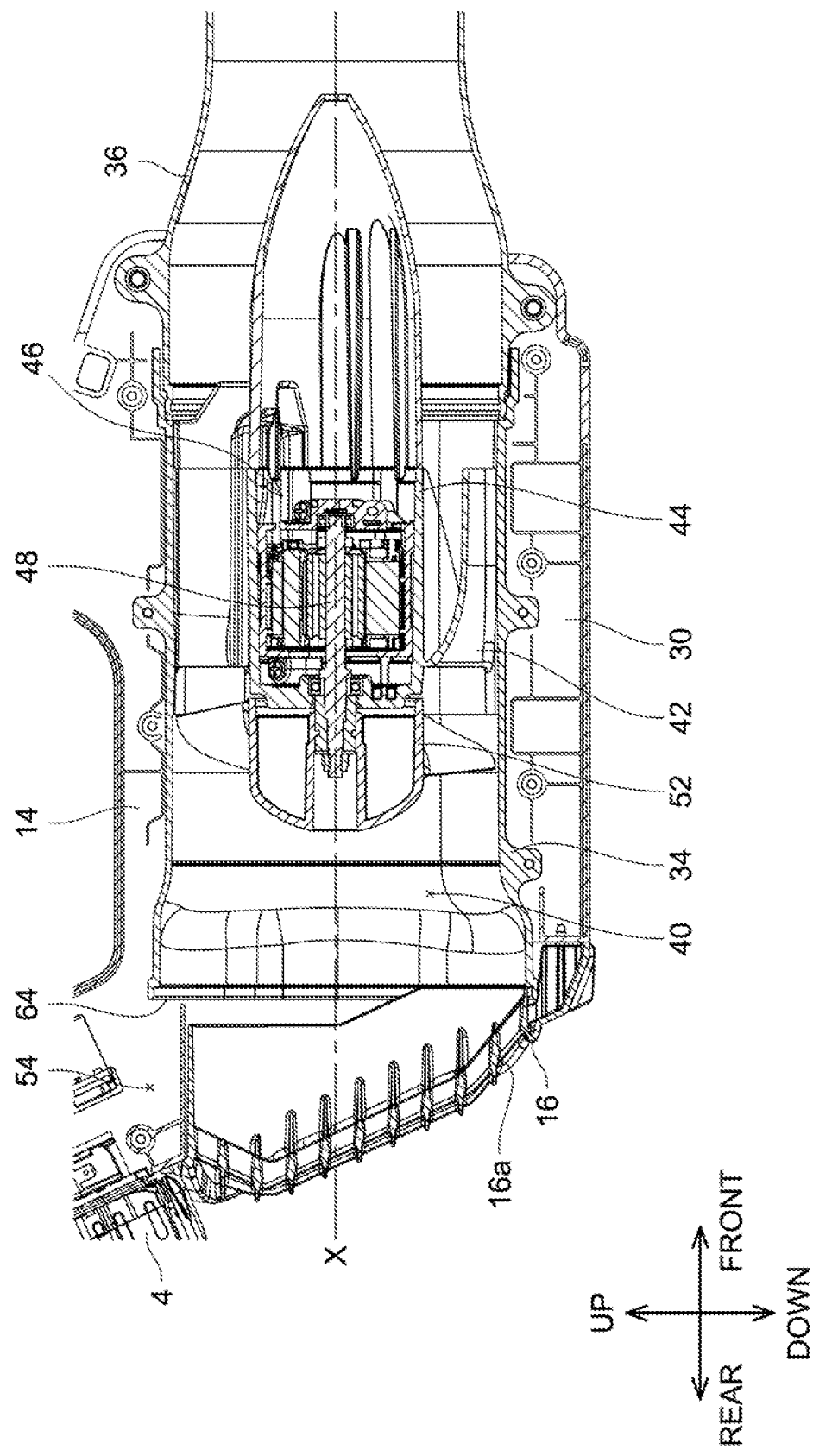
FIG. 3 is a cross-sectional view of the blower 2 of the embodiment in the vicinity of a lower housing 14 of the blower 2, along a plane perpendicular to a right-left direction.

As shown in FIG. 3, the main body 10 further comprises an outer tubular member 34, a nozzle 36, a plurality of fins 42, and an inner tubular member 44. The outer tubular member 34 is disposed in the inner space of the lower housing 14. The outer tubular member 34 has a tubular shape extending in the front-rear direction.

One end of the nozzle 36 is inserted in a front opening of the outer tubular member 34. The nozzle 36 is fixed to the lower housing 14. The nozzle 36 has a tubular shape extending in the longitudinal direction of the blower 2. Hereinafter, an opening at the other end of the nozzle 36 will be referred to as an air discharge hole 36a.

An air passage 40 is formed between the air intake holes 16a of the cover member 16 and the air discharge hole 36a of the nozzle 36. The air passage 40 is defined by an inner surface of the outer tubular member 34, an inner surface of the nozzle 36, an outer surface of the inner tubular member 44, the cover member 16, and the lower housing 14. The air passage 40 extends in the longitudinal direction of the blower 2. The air passage 40 includes the air discharge hole 36a at its one end (i.e., its front end) in the longitudinal direction of the blower 2, and the air intake holes 16a at the other end (i.e., its rear end) in the longitudinal direction of the blower 2. The air passage 40 communicates with the outside of the blower 2 through the air intake holes 16a and the air discharge hole 36a.

The plurality of fins 42 is connected to the inner surface of the outer tubular member 34. Although not shown, the fins 42 are arranged at equal intervals in a circumferential direction of the inner surface of the outer tubular member 34. The fins 42 extend from the inner surface of the outer tubular member 34 toward the central axis of the outer tubular member 34. The fins 42 are configured to swirl air flowing through the air passage 40.

The inner tubular member 44 is supported by the fins 42. The fins 42 are connected to the outer surface of the inner tubular member 44. The inner tubular member 44 extends in the longitudinal direction of the blower 2. The diameter of the outer surface of the inner tubular member 44 is constant from its rear end to intermediate position, and gradually decreases from the intermediate position to the front end.

A motor 46 is housed inside the inner tubular member 44. The motor 46 is, for example, an inner-rotor brushless motor. When electric power is supplied from the battery 4 to the motor 46, a shaft 48 of the motor 46 rotates about a rotation axis X. The rotation axis X coincides with the central axis of the outer tubular member 34. A direction along the rotation axis X coincides with the longitudinal direction of the blower 2. In FIG. 3, the rotation axis X is illustrated by a dot-dash line.

One end of the shaft 48 protrudes from the rear end of the inner tubular member 44 to the outside of the inner tubular member 44. A fan 52 is fixed to the one end of the shaft 48. The fan 52 is an axial fan. The fan 52 is configured to rotate about the rotation axis X. Along the rotation axis X, the fan 52 sucks in air from the rear and passes the air forward. As the shaft 48 rotates, the fan 52 rotates in conjunction with it. As a result, air outside the blower 2 flows into the air passage 40 from the air intake holes 16a, and then flows out from the air discharge hole 36a to the outside of the blower 2.

Figure 4:
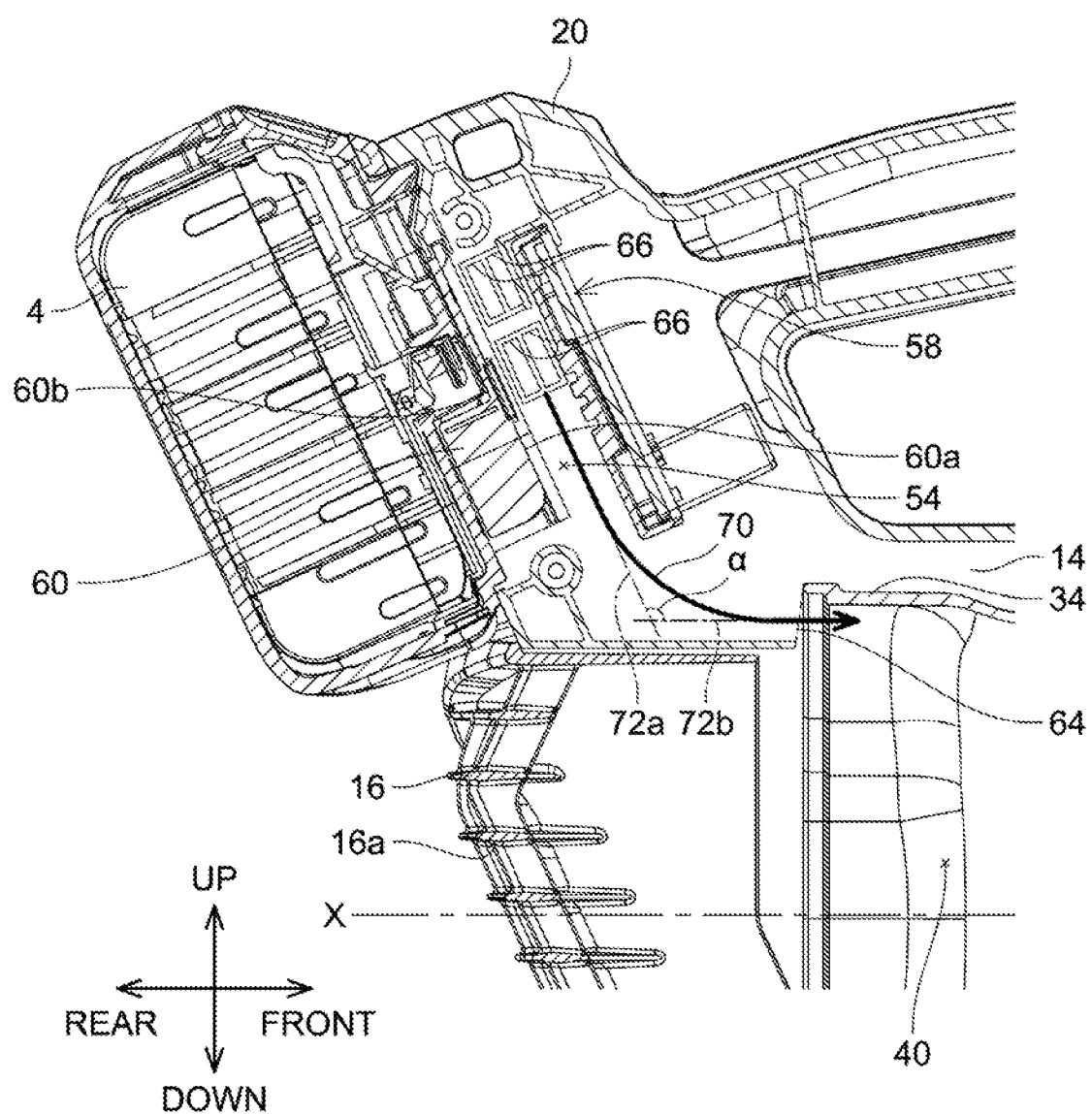
FIG. 4 is a cross-sectional view of the blower 2 of the embodiment in the vicinity of an upper housing 20 of the blower 2, along the plane perpendicular to the right-left direction.

As shown in FIG. 4, the blower 2 further comprises a control unit 58 and a battery terminal 60. The control unit 58 is housed in a chamber 54 formed inside the upper housing 20. The control unit 58 is fixed to the upper housing 20. The control unit 58 is disposed on an air intake holes 16a side relative to the fan 52 with respect to the direction along the rotation axis X. The control unit 58 comprises, for example, multiple pairs of switching elements, and controls drive of the motor 46 by controlling electric power supplied to the motor 46. The control unit 58 controls the drive of the motor 46 according to an operation performed on the trigger switch 26. The control unit 58 is inclined with respect to the direction along the rotation axis X.

The battery terminal 60 is attached to the rear surface of the upper housing 20. The battery terminal 60 penetrates the rear surface of the upper housing 20 in a thickness direction thereof. The battery terminal 60 is exposed to both the chamber 54 and the outside of the upper housing 20. Hereinafter, a portion of the battery terminal 60 that is exposed to the chamber 54 will be referred to as an inner exposed portion 60a, and a portion of the battery terminal 60 that is exposed to the outside of the upper housing 20 will be referred to as an outer exposed portion 60b. The battery terminal 60 is disposed such that the inner exposed portion 60a faces the control unit 58. The battery terminal 60 is disposed on the air intake holes 16a side relative to the control unit 58 in the direction along the rotation axis X. The battery 4 is detachably attached to the outer exposed portion 60b of the battery terminal 60. The battery terminal 60 is connected to the control unit 58 via wiring (not shown).

The main body 10 includes a second communication hole 64. In FIG. 4, the second communication hole 64 is illustrated by a broken line in order to facilitate understanding of the position of the second communication hole 64. The second communication hole 64 is disposed on the air intake holes 16a side relative to the fan 52 (see FIG. 3) and on a fan 52 side relative to the control unit 58, with respect to the direction along the rotation axis X. The second communication hole 64 is formed between the rear end of the outer tubular member 34 and the lower housing 14. The second communication hole 64 communicates a part of the air passage 40 that is on the air intake holes 16a side relative to the fan 52 to the chamber 54. Thus, air flowing in from the air intake holes 16a and air flowing in from the second communication hole 64 flow through the air passage 40.

The upper housing 20 includes a plurality of first communication holes 66 (eight in the present embodiment). In this embodiment, four first communication holes 66 are disposed in a left side surface of the upper housing 20 (see FIG. 4), and the remaining four first communication holes 66 are disposed in a right side surface of the upper housing 20 (see FIG. 1). The first communication holes 66 penetrate the upper housing 20 in the thickness direction.

The first communication holes 66 communicate the chamber 54 to the outside of the upper housing 20 (i.e., the outside of the blower 2). The first communication holes 66 are disposed on the air intake holes 16a side relative to the fan 52 and on the air intake holes 16a side relative to the second communication hole 64, with respect to the direction along the rotation axis X. When the blower 2 is viewed along the right-left direction, the first communication holes 66 are disposed between the control unit 58 and the inner exposed portion 60a of the battery terminal 60.

As shown in FIG. 4, a cooling air passage 70 is formed in the chamber 54. In FIG. 4, an example of the cooling air passage 70 is illustrated by a solid arrow. The cooling air passage 70 is a passage that reaches the second communication hole 64 from the first communication holes 66. The cooling air passage 70 passes between the control unit 58 and the inner exposed portion 60a of the battery terminal 60. After passing between the control unit 58 and the inner exposed portion 60a of the battery terminal 60, the cooling air passage 70 bends at an angle α and reaches the second communication hole 64. The angle α is 90 degrees or greater. That is, the cooling air passage 70 of the present embodiment is a passage that reaches the second communication hole 64 from the first communication holes 66 without turning at an angle less than 90 degrees. In FIG. 4, dot-dash lines respectively indicate an extension line 72a of a part of the cooling air passage 70 that passes between the control unit 58 and the inner exposed portion 60a of the battery terminal 60 and an extension line 72b of a part of the cooling air passage 70 that reaches the second communication hole 64. The angle α is an angle formed between the extension line 72a and the extension line 72b.

When the fan 52 rotates in the blower 2, air flows into the chamber 54 through the first communication holes 66. The air having flowed into the chamber 54 passes through the cooling air passage 70. The air firstly passes between the control unit 58 and the inner exposed portion 60a of the battery terminal 60, passes through the second communication hole 64, and then flows into the air passage 40 from the air intake holes-16a side opening of the outer tubular member 34. The air having flowed into the air passage 40 from the second communication hole 64 joins air having flowed into the air passage 40 from the air intake holes 16a, passes through the fan 52, and then flows out to the outside of the blower 2 from the air discharge hole 36a.

As described above, the blower 2 of the present embodiment comprises the air passage 40, the fan 52, the motor 46, the control unit 58, and the chamber 54. The air passage 40 includes the air intake holes 16a through which air flows in, and the air discharge hole 36a through which air flows out. The fan 52 is disposed in the air passage 40, and passes the air from the air intake holes 16a toward the air discharge hole 36a. The motor 46 rotates the fan 52. The control unit 58 controls the drive of the motor 46. The chamber 54 houses the control unit 58. As shown in FIG. 4, the chamber 54 includes the first communication holes 66 which communicate the outside of the blower 2 to the chamber 54, and the second communication hole 64 which communicates a part of the air passage 40 that is on the air intake holes 16a side relative to the fan 52 to the chamber 54. In the chamber 54, the cooling air passage 70 is formed. Along the cooling air passage 70, air having flowed in from the first communication holes 66 passes the control unit 58 and then flows out from the second communication hole 64. With respect to the direction along the rotation axis X of the fan 52, the first communication holes 66 are disposed on the air intake holes 16a side relative to the fan 52. In this configuration, the cooling air passage 70 extends from the first communication holes 66, which are disposed on the air intake holes 16a side relative to the fan 52, to the second communication hole 64 which is disposed on the air intake holes 16a side relative to the fan 52, with respect to the direction along the rotation axis X of the fan 52. Thus, this configuration can shorten the cooling air passage 70 and reduce a pressure loss of the air flowing through the cooling air passage 70, as compared with a configuration in which the first communication holes 66 are disposed on the air discharge hole 36a side relative to the fan 52 and the second communication hole 64 is disposed on the air intake holes 16a side relative to the fan 52. Consequently, the above configuration enables a sufficient amount of air to flow through the cooling air passage 70 to cool the control unit 58 with less energy, without increasing a rotational speed of the fan 52.

The cooling air passage 70 includes the passage which reaches the second communication hole 64 from the first communication holes 66 via the control unit 58 without turning at an angle less than 90 degrees. In this configuration, air flowing through the cooling air passage 70 flows from the first communication holes 66 to the second communication hole 64 via the control unit 58 without turning at an angle less than 90 degrees. Thus, the pressure loss of the air flowing through the cooling air passage 70 is small as compared with a configuration in which the air turns at an angle less than 90 degrees. As a result, the configuration enables a sufficient amount of air to flow through the cooling air passage 70 to cool the control unit 58 with less energy, without increasing the rotational speed of the fan 52.

The blower 2 further comprises the battery 4 and the battery terminal 60. The battery 4 supplies electric power to the motor 46. The battery 4 is detachably attached to the battery terminal 60. At least a part of the battery terminal 60 (i.e., the inner exposed portion 60a) is disposed in the chamber 54. Air flowing through the cooling air passage 70 passes the inner exposed portion 60a of the battery terminal 60 and the control unit 58. Thus, this configuration can cool both the battery terminal 60 and the control unit 58.

The control unit 58 and the inner exposed portion 60a of the battery terminal 60 are disposed to face each other in the chamber 54. Air flowing through the cooling air passage 70 passes between the control unit 58 and the inner exposed portion 60a of the battery terminal 60. In this configuration, the air flowing through the cooling air passage 70 cools both the control unit 58 and the battery terminal 60 as it passes between the control unit 58 and the inner exposed portion 60a of the battery terminal 60. Thus, this configuration can shorten the cooling air passage 70 and reduce the pressure loss of air flowing through the cooling air passage 70, as compared with a configuration in which air firstly passes one of the control unit 58 and the inner exposed portion 60a of the battery terminal 60, and then passes the other of the control unit 58 and the inner exposed portion 60a of the battery terminal 60.

The control unit 58 is inclined with respect to the direction along the rotation axis X of the fan 52. In a general blower, the direction along the rotation axis X of the fan 52 coincides with the longitudinal direction of the blower. The above configuration enables reduction in the size of the chamber 54, which houses the control unit 58, with respect to the longitudinal direction of the blower 2, thereby reducing the size of the blower 2 in the longitudinal direction.

As shown in FIG. 3, the fan 52 is an axial fan. This configuration enables reduction in the size of the blower 2 as compared with a configuration in which the fan 52 is a centrifugal fan.

As shown in FIG. 1, the blower 2 further comprises the handle 24 configured to be gripped by the operator to allow him/her to carry the blower 2 by gripping the handle 24 with the hand. This configuration enables the operator to easily handle the blower 2.

In an aspect of the blower 2, the cooling air passage 70 may include a passage that turns at an acute angle less than 90 degrees on the way to the second communication hole 64 from the first communication holes 66 via the control unit 58.

In an aspect of the blower 2, the cooling air passage 70 may be configured such that air firstly passes one of the control unit 58 and the inner exposed portion 60a of the battery terminal 60, and then passes the other of the control unit 58 and the inner exposed portion 60a of the battery terminal 60.

In an aspect of the blower 2, the battery 4 may not be attached to the upper housing 20 and electric power may be supplied to the blower 2 through a power cord.

In an aspect of the blower 2, the motor 46 may be an outer-rotor brushless motor or a brush motor.

In an aspect of the blower 2, the fan 52 may be a centrifugal fan or a diagonal flow fan.

In an aspect of the blower 2, the control unit 58 may be disposed orthogonal to the direction along the rotation axis X or parallel to the direction along the rotation axis X.

In an aspect of the blower 2, the blower 2 may be a backpack blower.

What is claimed is:

1. A blower comprising:
   an air passage including an air intake hole through which air flows in and an air discharge hole through which air flows out;
   a fan disposed in the air passage and configured to pass air from the air intake hole to the air discharge hole;
   a motor configured to rotate the fan;
   a control unit configured to control drive of the motor; and
   a chamber which houses the control unit;
   wherein
   the chamber includes a first communication hole and a second communication hole, the first communication hole communicating outside of the blower to the chamber, and the second communication hole communicating a part of the air passage that is disposed on an air intake hole side relative to the fan to the chamber,
   the chamber includes a cooling air passage which allows air having flowed in from the first communication hole to flow out from the second communication hole via the control unit,
   the first communication hole is disposed on the air intake hole side relative to the fan with respect to a direction along a rotation axis of the fan,
   the cooling air passage includes a passage which reaches the second communication hole from the first communication hole via the control unit without turning at an acute angle less than 90 degrees,
   the blower further comprises a cover member disposed at one end of the air passage and including the air intake hole,
   the chamber communicates to the air passage without passing through the air intake hole of the cover member, and
   when the fan rotates, a first air flow and a second air flow are generated, wherein the first air flow flows into the air passage from the outside of the blower through the air intake hole of the cover member, and the second air flow flows into the chamber from the outside of the blower through the first communication hole and then flows into the air passage through the second communication hole without passing through the air intake hole of the cover member.

2. The blower according to claim 1, further comprising:
   a battery configured to supply electric power to the motor; and
   a battery terminal to which the battery is detachably attached;
   wherein
   at least a part of the battery terminal is disposed in the chamber, and
   air flowing through the cooling air passage passes the control unit and the at least a part of the battery terminal.

3. The blower according to claim 2, wherein
   the control unit and the at least a part of the battery terminal are disposed to face each other in the chamber, and
   air flowing through the cooling air passage passes between the control unit and the at least a part of the battery terminal.

4. The blower according to claim 1, wherein
   the control unit is inclined with respect to the direction along the rotation axis of the fan.

5. The blower according to claim 1, wherein the fan is an axial fan.

6. The blower according to claim 1, further comprising:
   a handle configured to be gripped by an operator to allow the operator to carry the blower by gripping the handle with a hand of the operator.

7. The blower according to claim 6, wherein the handle is disposed on the fan side relative to the air intake hole with respect to the direction along the rotation axis of the fan.

8. The blower according to claim 3, wherein when the blower is viewed along a left-right direction perpendicular to the direction along the rotation axis of the fan, the first communication hole is disposed between the control unit and the at least a part of the battery terminal.

9. The blower according to claim 1, wherein the second communication hole is disposed on the fan side relative to the air intake hole with respect to the direction along the rotation axis of the fan.

* * * * *